Oct. 25, 1932.    J. F. WINDSOR    1,884,466
WELDING APPARATUS
Filed June 18, 1930    3 Sheets-Sheet 3
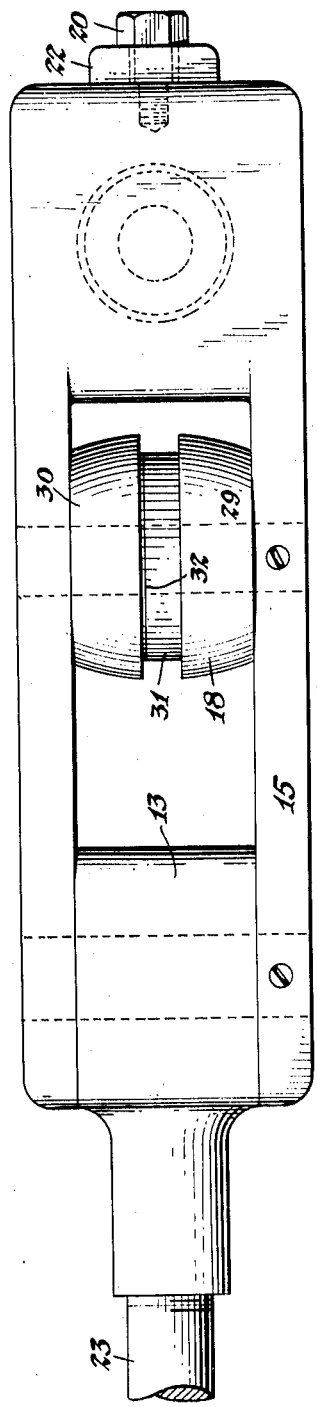
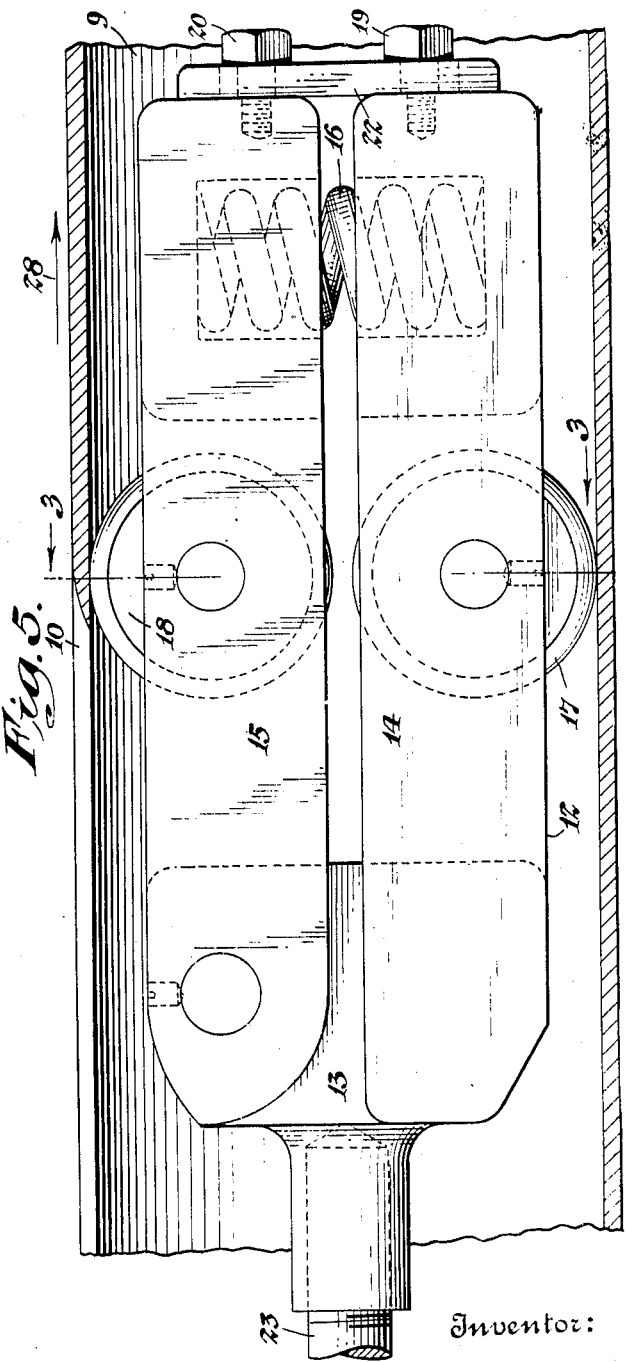
Inventor:
John F. Windsor
By his Attorney
Clarence D. Kerr Patented Oct. 25, 1932

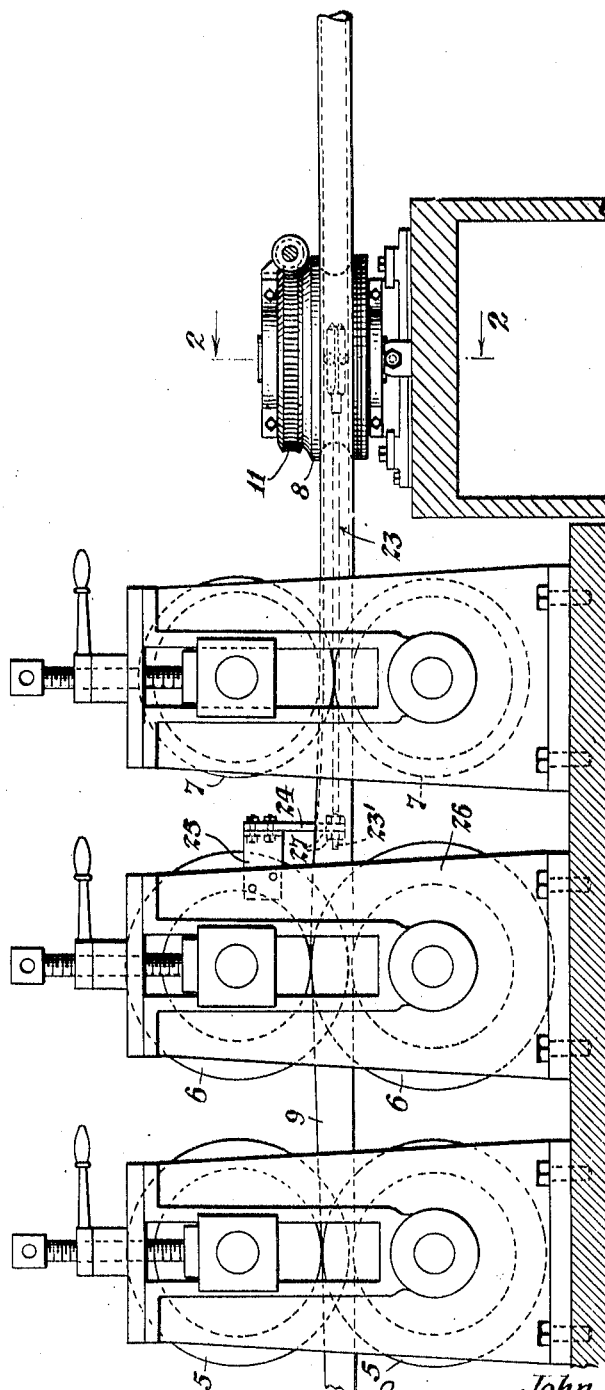

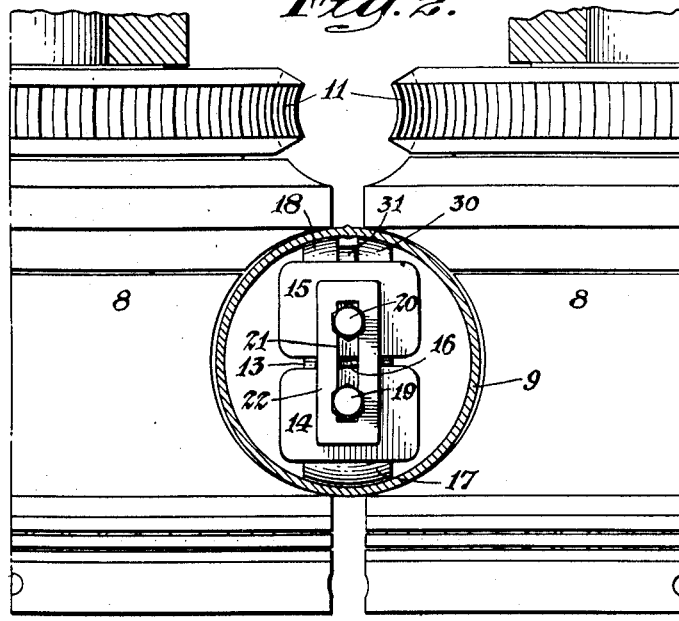
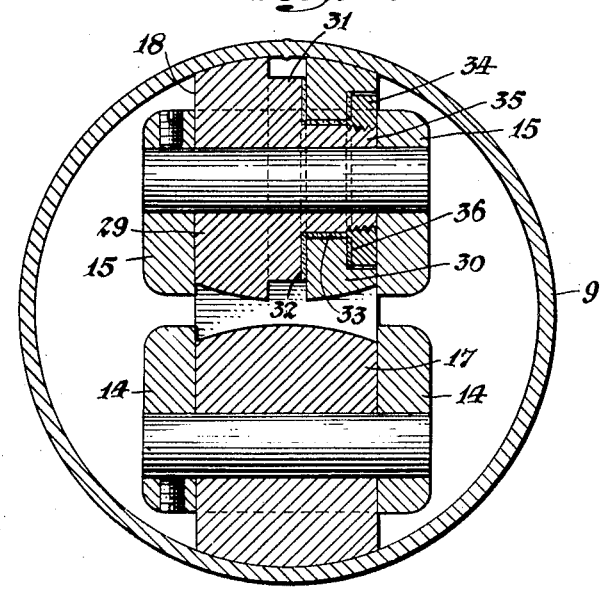

1,884,466

UNITED STATES PATENT OFFICE

JOHN F. WINDSOR, OF CHICAGO, ILLINOIS, ASSIGNOR, BY MESNE ASSIGNMENTS, TO CLAYTON MARK & COMPANY, OF CHICAGO, ILLINOIS, A CORPORATION OF DELAWARE

WELDING APPARATUS

Application filed June 18, 1930. Serial No. 461,942.

This invention relates to welding apparatus and more particularly to apparatus for butt-welding metal tubing. In effecting such welding the tube stock is usually fed through a welding throat comprising rollers which engage and compress the stock to force the edges of the seam into firm contact and which pass an electric current across the seam. In the welding of stock of substantial wall thickness, there is a tendency for the seam edges and portions of the stock adjacent thereto to sag at the welding point under the influence of the welding heat, and this tendency becomes more pronounced as the wall thickness increases. It is a prime object of my invention to provide simple and effective means for reinforcing the tube stock internally whereby such sagging of stock in proximity to the seam may be avoided. My invention further comprises other features which will be hereinafter described and claimed.

In the accompanying drawings, wherein I have illustrated an embodiment of my invention:

Fig. 1 is a view in side elevation of a portion of a welding apparatus having my invention applied thereto.

Fig. 2 is an enlarged detail view showing a portion of the electrode rolls and tube stock in conjunction with my seam supporting means.

Fig. 3 is a sectional detail view taken on line 3—3 of Fig. 5.

Fig. 4 is a plan view of the supporting means, and

Fig. 5 is a view showing the tube stock in section and the seam supporting means in side elevation.

Referring to the drawings, there is shown in Fig. 1 a portion of a welding apparatus which includes a series of pairs of rolls 5—5, 6—6, and 7—7, for forming the sheet stock or skelp into tubular shape, as is well understood in the art. Beyond the aforesaid forming rolls is the welding head, which is shown as comprising a pair of horizontal rolls 8, 8 having peripheries curved for receiving the tube stock as shown. The rollers 8, 8, serve to support the tube stock, to compress the stock to bring into firm contact the edges of the seam to be welded, and to pass electric current across the seam for welding the latter. The particular means here shown for supporting, compressing, and welding the tube stock is illustrative merely and it will be understood that my invention is not restricted to any specific welding apparatus. In the operation of the welding apparatus the stock 9 is moved continuously forwardly through the forming rolls and thence between the welding rolls 8, 8. The latter contact with tube-stock on opposite sides of the seam 10, which is formed by the abutting edges of said stock; and welding is effected by the passage of an electric current between the welding rolls and across said seam. The rolls 8, 8 are shown provided with worm wheels 11, 11 whereby they may be rotated so as to provide slippage between the rolls and the tube stock and thus prevent pitting thereof, as set forth in my application Serial No. 390,929, filed Sept. 7, 1929.

In carrying out my invention I insert within the tube stock and between the rolls 8, 8, a member designated generally as 12 and comprising a head portion 13 and a pair of jaws 14, 15. The jaw member 14 is shown integral with the head 13 while the jaw 15 is pivoted to said head. A spring 16, interposed between said jaws near the forward ends thereof as shown, tends to move the jaw 15 away from the jaw 14. Rollers 17, 18, which may be of metal, are rotatably carried by the respective jaws 14, 15 as shown; each roller extending outwardly beyond the associated jaw for engagement with the interior of the tube stock. The jaws at their forward ends are provided with bolts or screws 19, 20, respectively, which extend through a slot 21 in a plate 22, the heads of the bolts or screws engaging the outer side of the plate as indicated. The jaw 15 is thus effectively guided in its movements with respect to the lower jaw. The head 13 is threaded or otherwise secured to a rod 23 which may be supported at its rear end in any suitable way. For example, said end may be attached, as shown, to an arm 24 adapted to be fastened to a bracket 25 secured to the pedestal 26 that supports the forming rolls 6—6. Between the forming rolls 6—6 and 7—7 the edges of the stock are separated so that the arm 24 may readily extend downwardly into the stock as shown in Fig. 1. The rod 23 may be inserted into the tube stock from the front and its rear end portion 23′, which is threaded, passed into an opening or slot in the lower end of arm 24, after which nuts 27, 27 may be turned on said threaded portion to clamp the rod tightly to the arm 24, and said arm then bolted to the bracket 25.

The peripheries of the rollers 17, 18, as shown in Fig. 3 are curved to conform with the inner circumference of the tube stock. Said rollers, as shown, are pressed by spring 16 into engagement with the lower and upper portions respectively of the interior of the stock and provide an effective internal support for the tube portions adjacent the seam 10. The roller 18 preferably underlies the seam substantially at the welding point and thereby effectively prevents sagging of the stock at and adjacent to the seam edges as the latter become heated to the welding temperature.

In Fig. 5 the arrow 28 designates the direction of travel of the tube stock, and it will be seen that the roller 18 lies beneath the seam 10 at the point where welding takes place. The spring 16 maintains the rollers firmly pressed against the interior of the tube stock and enables the member 12 and rollers aforesaid to be employed readily in connection with tube stock of varying internal diameters. It will be noted that the roller 18 is shown as comprising two sections 29 and 30 which engage the tube stock on opposite sides of the seam. The section 29 is shown provided with a shouldered portion 31 of less diameter than the main portion of said section and serving to appropriately space the section 30. The sections 29 and 30 are separated from each other by an insulating washer 32 and an insulating sleeve 33. A collar 34 having threaded engagement with an extension 35 of roller section 29 maintains the sections 29, 30, in assembled relation. An insulating washer 36 is interposed between collar 34 and roller section 30. It will be seen that with the construction above noted, current cannot pass from one side of the seam 10 to the other through the roller 18; the shouldered portion 31 of section 29 which lies directly beneath the seam being out of contact with the tube and the roller portion 30 which engages the tube on the opposite side of the seam from that engaged by roller section 29 being insulated from said section. The extent of the shouldered portion 31 in the direction of the axis of the roller is such that the roll sections 29, 30 may engage the tubing as close to the seam as desired. In lieu of the specific arrangement of roller sections above described, a pair of roller sections engaging the tube on opposite sides of the seam and separated by a section of insulating material engaging the tube at the seam and extending from one side of the seam to the other may be employed. Alternatively, the roller 18 may be made as a solid body of insulating material such as Redwood fiber for both supporting the tube stock at the sides of the seam and preventing current from escaping through the roller and around the seam. Various other modifications will readily occur.

It will be apparent that through my invention sagging of the tube stock at and adjacent the seam edges during welding operations is prevented and that said edges are positively maintained in alignment. My invention further insures that the contour of the tube is a segment of a circle at the weld, and also assures effective electrical contact between the tube and the electrodes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In an apparatus for butt welding metal tubing and comprising electrodes for passing current across the seam to be welded, means for preventing sagging of the tube portions adjacent the seam, said means comprising a plurality of rollers engaging portions of the interior of the tube stock, and pressure means within said stock and cooperating with said rollers for maintaining the latter in engagement with said stock.

2. Apparatus for internally supporting metal tubing at the welding point, said apparatus comprising a member insertible within said tubing and having relatively movable jaws, rollers carried by said jaws and adapted to engage portions of the interior of said tubing, and means interposed between said jaws for pressing said rollers against the interior of said stock.

3. Apparatus for internally supporting metal tubing at the welding point, said apparatus comprising a member insertible within said tubing and having relatively movable jaws, rollers carried by said jaws and adapted to engage portions of the interior of said tubing, means interposed between said jaws for causing relative separation thereof, and guiding means associated with said jaws.

4. Apparatus for internally supporting metal tubing at the welding point, said apparatus comprising a member insertible within said tubing and having relatively movable jaws, rollers carried by said jaws and adapted to engage portions of the interior of said tubing, pressure means interposed between said jaws and tending to cause relative separation thereof, a slotted guide plate, and projections on said jaws engaging said plate.

5. Apparatus for internally supporting metal tubing at the welding point, said apparatus comprising a head insertible into the tubing, a jaw integral with said head, a jaw pivotally mounted on said head, pressure means interposed between said jaws, and rollers carried by said jaws respectively and adapted to engage internal portions of the tube stock.

6. Apparatus for internally supporting tubing at the welding point, said apparatus comprising an element insertible into the tubing and carrying a plurality of rollers for engagement with the interior surface of the tubing, means tending to cause relative separation of said rollers for maintaining the same in firm engagement with the tubing, one of said rollers comprising sections insulated from each other and engageable with the tube stock on opposite sides of the seam to be welded.

7. In an apparatus for butt welding metal tubing and comprising electrode rollers for passing current across the seam to be welded, means positioned within the tubing for preventing sagging of the stock adjacent the seam at the welding point, said means comprising a member having a pair of relatively movable jaws, rollers carried by said jaws respectively, and means for maintaining said rollers in engagement with internal portions of the stock, one of said rollers comprising insulating material for preventing escape of current through said roller and around said seam.

8. In an apparatus for butt welding metal tubing and comprising electrode rollers for passing current across the seam to be welded, means positioned within the tubing for preventing sagging of the stock adjacent the seam at the welding point, said means comprising a member having a pair of relatively movable jaws, rollers carried by said jaws respectively, one of said rollers comprising sections insulated from each other for engaging portions of the tube stock on opposite sides of the seam.

9. In an apparatus for butt welding metal tubing and comprising electrodes for passing current across the seam to be welded, means for preventing sagging of the tube portions adjacent the seam, said means comprising a plurality of rollers each directly engaging a corresponding portion of the interior of the tube stock, and means comprising a spring acting upon said rollers for forcing the latter away from each other and maintaining the rollers in engagement with the stock.

In testimony whereof, I have signed my name to this specification this 12th day of June, 1930.

JOHN F. WINDSOR.